US011783040B2

(12) United States Patent
Brown et al.

(10) Patent No.: US 11,783,040 B2
(45) Date of Patent: Oct. 10, 2023

(54) CRYPTOGRAPHICALLY VERIFYING A FIRMWARE IMAGE WITH BOOT SPEED IN AN INFORMATION HANDLING SYSTEM

(71) Applicant: Dell Products L.P., Round Rock, TX (US)

(72) Inventors: Michael E. Brown, Austin, TX (US); Nagendra Varma Totakura, Round Rock, TX (US); Vasanth Venkataramanappa, Austin, TX (US); Jack E. Fewx, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 17/371,417

(22) Filed: Jul. 9, 2021

(65) Prior Publication Data

US 2023/0009088 A1 Jan. 12, 2023

(51) Int. Cl.
*G06F 21/57* (2013.01)
*G06F 9/4401* (2018.01)
*G06F 9/48* (2006.01)
*G06F 16/11* (2019.01)
*G06F 12/0804* (2016.01)
*G06F 9/50* (2006.01)

(52) U.S. Cl.
CPC .......... *G06F 21/572* (2013.01); *G06F 9/4401* (2013.01); *G06F 9/4881* (2013.01); *G06F 9/5027* (2013.01); *G06F 12/0804* (2013.01); *G06F 16/11* (2019.01); *G06F 2212/1032* (2013.01); *G06F 2221/033* (2013.01)

(58) Field of Classification Search
CPC .... G06F 12/0804; G06F 16/01; G06F 21/572; G06F 21/575; G06F 2212/1032; G06F 2221/033; G06F 9/4401; G06F 9/4881; G06F 9/5027
See application file for complete search history.

(56) References Cited

U.S. PATENT DOCUMENTS

| 9,921,915 | B2 | 3/2018 | Hung |
| 2016/0179687 | A1* | 6/2016 | Kumar ................ G06F 12/0895 711/135 |
| 2018/0247059 | A1* | 8/2018 | Nara .................... G06F 21/6218 |
| 2018/0276385 | A1 | 9/2018 | Heck et al. |
| 2021/0303692 | A1* | 9/2021 | Godavarthi ........... G06F 21/575 |

* cited by examiner

*Primary Examiner* — Terrell S Johnson
(74) *Attorney, Agent, or Firm* — Larson Newman, LLP

(57) ABSTRACT

An information handling system includes a first memory that stores a firmware image associated with the baseboard management controller. The baseboard management controller begins execution of a kernel, which in turn performs a boot operation of the information handling system. The baseboard management controller begins a file system initialization program. During the boot operation, the baseboard management controller performs a full read and cryptographic verification of the firmware image via a DM-Verity daemon of the file system initialization program. In response to the full read of the firmware image being completed, the baseboard management controller provides a flush command to the kernel via the DM-Verity daemon. The baseboard management controller flushes a cache buffer associated with the baseboard management controller via the kernel.

20 Claims, 3 Drawing Sheets

CRYPTOGRAPHICALLY VERIFYING A FIRMWARE IMAGE WITH BOOT SPEED IN AN INFORMATION HANDLING SYSTEM

FIELD OF THE DISCLOSURE

This disclosure generally relates to information handling systems, and more particularly relates to cryptographically verifying a firmware image with boot speed in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a first memory that may store a firmware image associated with a baseboard management controller. The baseboard management controller may begin execution of a kernel, which in turn may perform a boot operation of the information handling system. The baseboard management controller begins a file system initialization program. During the boot operation, the baseboard management controller may perform a full read and cryptographic verification of the firmware image via a DM-Verity daemon of the file system initialization program. When the full read of the firmware image is complete, the baseboard management controller may provide a flush command to the kernel via the DM-Verity daemon. The baseboard management controller may flush a cache buffer associated with the baseboard management controller via the kernel.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
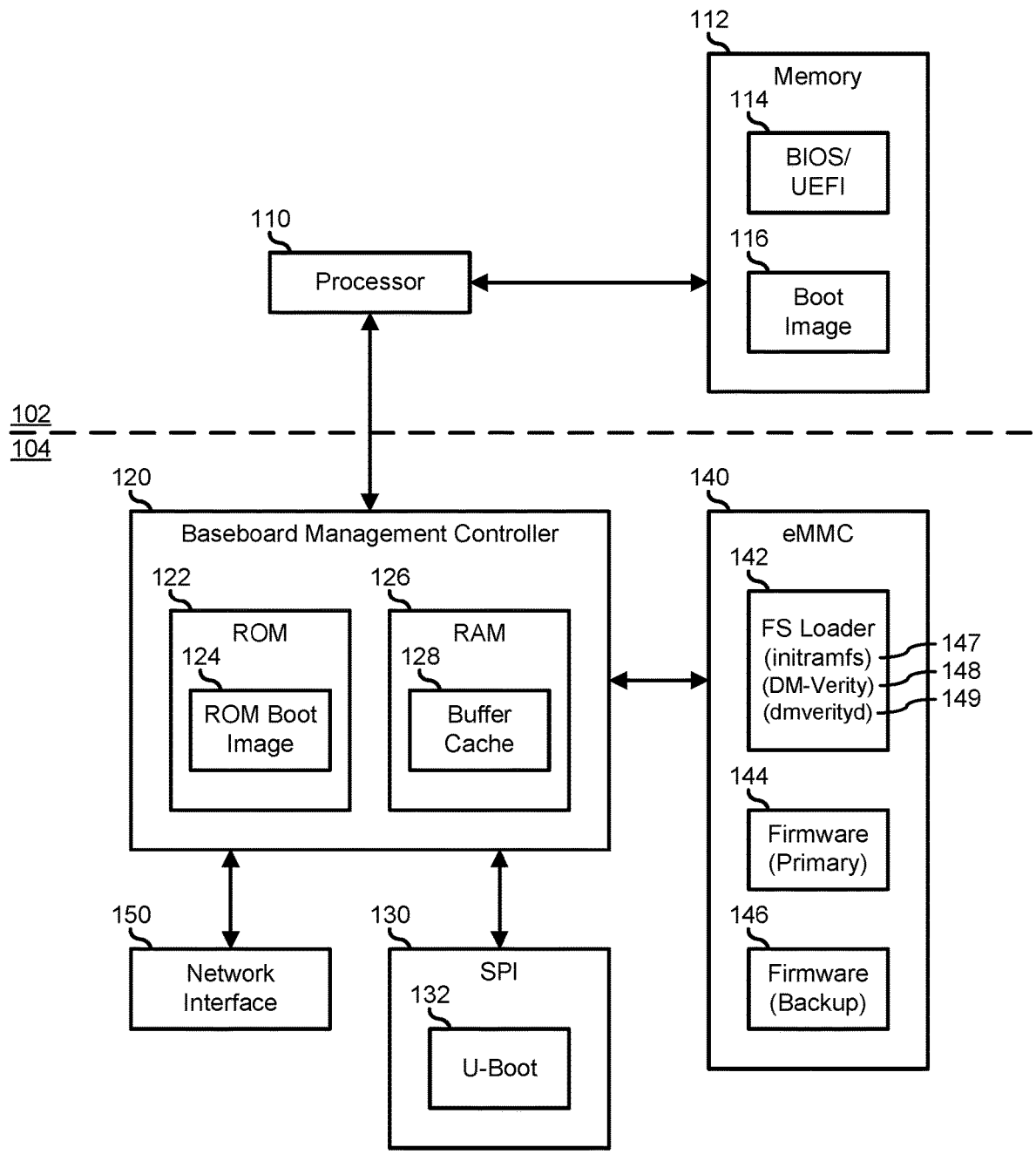
FIG. 1 is a block diagram of an information handling system according to an embodiment of the present disclosure.

FIG. 1 illustrates a portion of an information handling system 100 according to at least one embodiment of this disclosure. Information handling system 100 includes a host processing system 102 and a management system 104. Host processing system 102 represents hardware, firmware, and software components that are typically associated with a computer or other information handing system, and includes a processor 110 and a memory 112. Processor 110 represents one or more central processing units (CPUs), processor cores, or other processing devices, as needed or desired. Memory 112 represents one or more read-only memory (ROM) or random access memory (RAM) data storage devices of information handling system 100, including various volatile and non-volatile data storage devices such as Dual In-Line Memory Modules (DIMMS), Solid-State Drives (SSDs), disk drives, and the like. Processor 110 operates to execute machine-readable code out of memory 112 to perform the processing tasks of information handling system 100, such as to initialize the information handling system, to run an operating system, and to run application programs, as needed or desired. When host processing system 102 is powered on, processor 110 operates to execute basic input/output system/Universal Extensible Firmware Interface (BIOS/UEFI) code 114 from memory 112 to perform a Power On Self Test (POST), to initialize the components of host processing system 102, and execute a boot loader to load an operating system from boot image 116.

Management system 104 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for information handling system 100. In particular, management system 104 is connected to various components of host processing system 102 via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management system 104 includes network interface device 150 to provide a connection to an external management computer, and the management system can communicate with the management computer to report status information for information handling system 100, to receive BIOS/UEFI or system firmware updates, or to perform other task for managing and controlling the operation of information handling system 100. Management system 104 can operate off of a separate power plane from the components of host processing system 102 so that the management system receives power to manage information handling system 100 when the information handling system is otherwise shut down.

Management system 104 includes a BMC 120, a Serial Peripheral Interface (SPI) device 130, an embedded MultiMedia Card (eMMC) device 140, and a network interface device 150. An example of BMC 120 may include a commercially available BMC product or other device that operates in accordance with an Intelligent Platform Management Initiative (IPMI) specification, such as an Integrated Dell Remote Access Controller (iDRAC), an Embedded Controller (EC), or the like. Management system 104 may include additional memory devices, logic devices, security devices, or the like, as needed or desired. BMC 120 includes a ROM 122 and a RAM 126. ROM 122 includes a ROM boot image 124 that includes code that is the first code executed by BMC 120 upon power up of the BMC, as described further below. RAM 126 includes a cache buffer 128.

SPI device 130 represents a small flash memory device, typically having a 4-8 megabyte (MB) storage capacity that is accessed by BMC 120 via a SPI interface. SPI device 130 includes Universal Boot Loader (U-Boot) code 132 that includes code to load an operating system for BMC 120, as described further below. eMMC device 140 represents a large capacity non-volatile memory device, typically having 32-64 gigabyte (GB) storage capacity that is accessed by BMC 120 via a MultiMedia Card (MMC) interface. eMMC 140 includes a file system loader 142, a primary copy of firmware 144 for management system 104, and a backup copy of firmware 146, as described further below. Note that, primary firmware 144 and backup firmware 146 typically includes an OS, such as for a Linux OS. In an example, such as where information handling system 100 represents a client device like a desktop computer, a laptop computer, a workstation, or the like, backup firmware 146 is a duplicate copy of primary firmware 144. In another embodiment, such as where information handling system 100 represents an enterprise device like a server, a blade system, a network device, or the like, primary firmware 144 represents a current version of the firmware (that is, version "N"), and backup firmware 146 represents a previous version of the firmware (that is, version "N−1"). In an example, while file system loader 142 is illustrated in FIG. 1 as being separate from primary firmware 144 and backup firmware 146 in eMMC 140, an iteration of file system loader 142 may be located within primary firmware 144 and another iteration of file system loader 142 may be located within backup firmware 146.

When BMC 120 is powered on, the BMC is configured to begin executing code from ROM boot image 124. ROM boot image 124 operates to read U-Boot code 132 from SPI device 130, to cryptographically verify the contents of the U-Boot code, to load the U-Boot code to RAM 126, and to pass execution off to the U-Boot code. It will be understood that ROM boot image 124 represents the root of trust for all subsequent operations of management system 102. That is, the authenticity and security of all subsequent operations, and the validity of all other firmware elements of management system 104 is predicated on the fact that ROM boot image 124 has not been tampered with or altered in any way. As such, the content of ROM 122, and particularly the code associated with ROM boot image 124 must only be modified by authorized and authenticated agents. The details of authentication of firmware updates in a management system are known in the art and will not be further disclosed herein, except as needed to describe the present embodiments.

When execution is passed to the U-Boot code stored in RAM 126, the U-Boot code operates to read file system loader 142 from eMMC device 140, to cryptographically verify the contents of the file system loader, to load the file system loader to RAM 126, and to pass execution off to the file system loader. File system loader 142 includes a file system initialization program (initramfs) 147, a device mapper and verification program (DM-Verity) 148, and a daemon associated with the DM-Verity program (dmverityd) 149. initramfs 147 mounts a file system associated with eMMC 140, provides a hash tree and Forward Error Correcting (FEC) information for the data stored on the eMMC, and particularly for primary firmware 144 and backup firmware 146, and provides for error correction when a block read results in one or more read errors. DM-Verity 148 verifies the integrity of the blocks that include primary firmware 144 and backup firmware 146 based upon the hash tree. dmverityd 149 is a daemon that monitors the operations of DM-Verity 148, provides indications to initramfs 147 to perform the necessary error corrections, and writes indications to recovery mailbox when read errors occur. In an example, the recovery mailbox may be any suitable storage location within memory 126 such that large length messages may be stored to communicate a high number of corrupted or failed block numbers. Various code is described herein as being located at various memory devices at different times. It should be understood that management system 104 may include other memory devices, and that such code may be stored and executed from other memory devices than those described here, as needed or desired.

During the POST of information handling system 100, BIOS 114 may perform early calls into BMC 120, which in turn enables the BMC to boot quickly. In this example, the early call may increase the speed at which embedded firmware 144. The speed at which firmware 144 boots affects how quickly the user may access information handling system 100. In an example, different situations, such as hotswap situations. In these situations, a fast boot speed may ensure a management module may be able to manage power supplies and thermal components as quickly as possible and prevent fan ramp up.

In an example, security of firmware 144 may be critically important in information handling system 100. The integrity of firmware 144 must be verified before boot, and management system 104 must cryptographically check of all firmware filesystems before relying on executing code from those filesystems. In an example, reading a full system image at boot time may have an impact on performance in information handling system 100, but skipping validity checks may have disastrous consequences for security. Dmverityd 149 and other components improve information handling system 100 by performing an initial full read of the root file system (rootfs) image very early in the system boot.

In an example, this initial read may initiate a cryptographic integrity check that verifies the integrity of each block in firmware 144. dmverityd 149 may run in the background during the system boot, such that the system boot may immediately continue in parallel by mounting the rootfs immediately after starting the full read of the rootfs. In an example, dmverityd 149 mounting the rootfs may start the regular system boot process. System management 104 may utilize a combination of a read loop for the full image and process priorities to increase system boot speeds with full cryptographic integrity checking of the image. These operations may result in a reduced boot time than compared to a system boot with all integrity checking disable.

In an example, a reset operation may be performed in information handling system 100, such as a reset of processor 110. In response to the reset, U-boot 132 may load a kernel and initramfs 147. At block 206, a determination is made as to whether the kernel and initramfs were cryptographically verified. In an example, this decision is made to determine if the kernel and initramfs have been tampered with. If the kernel and initramfs are not verified, the U-boot switches the boot partition and reboots the management system at block 208, and the flow continues as stated above at block 204.

On boot of embedded firmware 144, boot loader 142 may cryptographically verify the kernel and initramfs 147. Based on the kernel and initramfs 147 being verified, loader 142 may start the kernel. In response to the kernel being initialized, initramfs 147 may take over and may mount the root filesystem. Upon the kernel being initialized, the kernel may perform a standard boot process of information handling system 100. In an example, initramfs 147 may perform full filesystem cryptographic integrity check in parallel with the standard boot process of firmware 144. For example, DM-Verity 148 may be started early in the ramfs process. In this example, DM-Verity 148 may start the full filesystem read early and perform the full filesystem read in parallel with the standard boot operations.

In an example, DM-Verity 148 may perform the full filesystem read in any suitable manner so that the standard boot may continue in parallel. For example, DM-Verity 148 may perform the full filesystem read in the background. During operation, DM-Verity 148 may read or store data from the integrity check to a buffer cache, which may be accessed by the kernel during the standard boot. In certain examples, DM-Verity 148 may perform the initial full filesystem read as quickly as possible, such that the data may be available in the buffer cache for use by the kernel.

While BMC 120 is executing both the kernel and DM-Verity 148 in parallel, any suitable number of operations may be implemented to prevent the DM-Verity process from consuming a lot of processing resources. For example, DM-Verity 148 may be assigned a lower system priority as compared to the standard boot to prevent the DM-Verity from consuming too much computing resources. The priority level of DM-Verity 148 may be controlled in any suitable manner including, but not limited to, increasing a nice level of the DM-Verity. In an example, the priority level of a process may be inversely proportional to the nice level. For example, as the nice level increases the priority level may decrease. In this example, DM-Verity 148 may be assigned any suitable high nice level including, but not limited to, a level nine, and a level ten. In another example, the priority level of a process may be proportional to the nice level, such that as the nice level drops the priority level as drops. In an example, the nice level may be any value that may cause the priority level of DM-Verity to be a low level.

In an example, DM-Verity 148 may store the read data in buffer cache 128 early in initramfs 147 process. In certain examples, the early storage of data in buffer cache 128, may increase the speed that the kernel may perform the standard boot. For example, the kernel may read data from cache buffer 128 and utilize the data during the standard boot. In certain examples, buffer cache 128 may be full, which in turn may cause a system failure because no additional needed data may be store in the buffer cache. Upon completion of the boot operations, DM-Verity 148 may provide a flush command to the kernel to drop the underlying cache, such as cache buffer 128. In an example, the flush or drop command may be any suitable command including, but not limited to, a posix_fadvise( ) system call. The drop of cache buffer 128 may free the memory space for use by other processes.

In an example, after the boot operations have been completed, DM-Verity 148 may perform slow patrol reads during runtime of information handling system 100. During the slow patrol reads, DM-Verity 148 may store data in cache buffer 128 as described above. Upon completion of the slow patrol read, DM-Verity may provide the flush or drop command for cache buffer 128 to the kernel. In an example, the flush command at the end of each patrol read may ensure that other operations may utilize cache buffer 128 without an overflow occurring.

Figure 2:
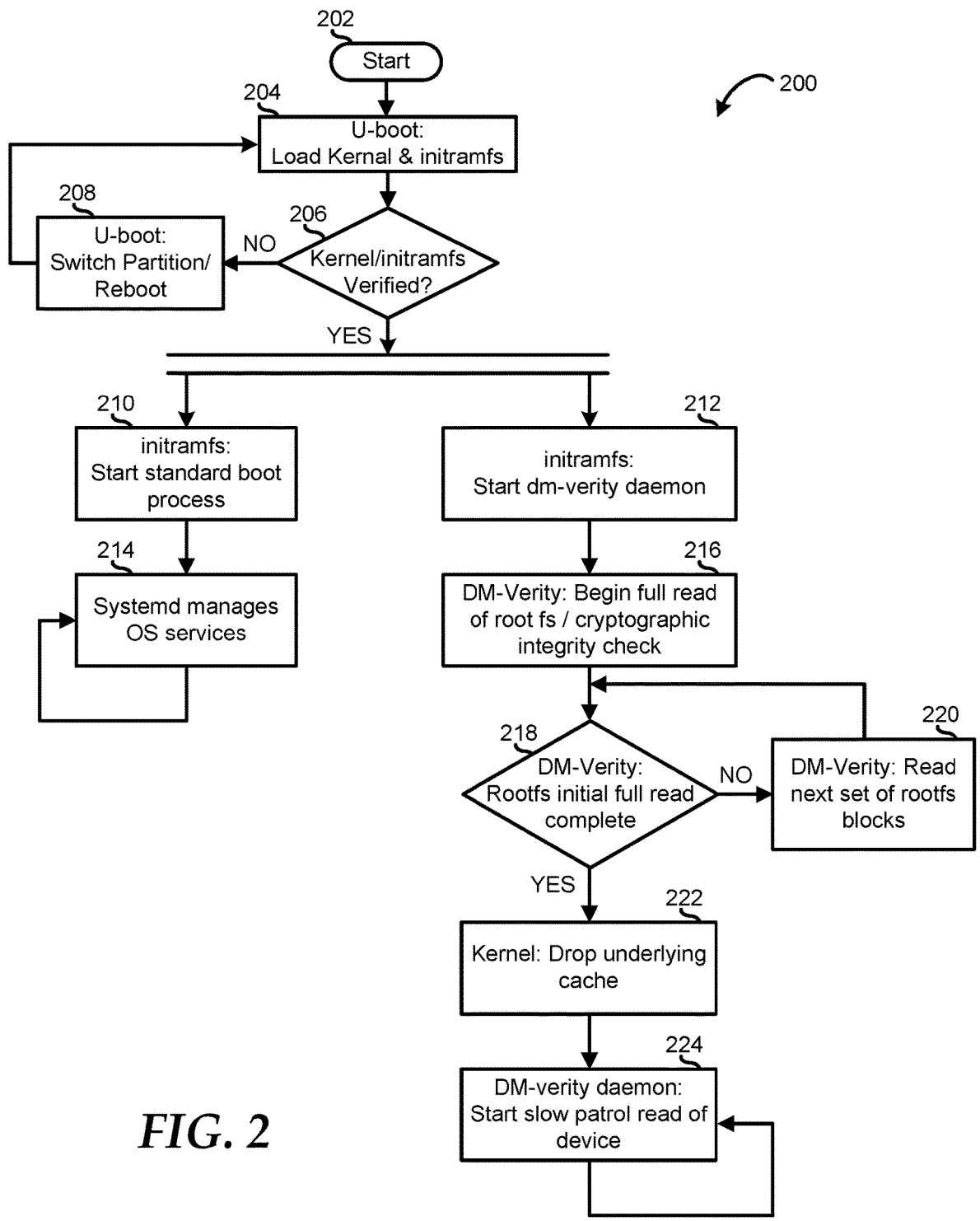
FIG. 2 is a flowchart illustrating a method for cryptographically verifying a firmware image with boot speed in an information handling system according to an embodiment of the present disclosure.

FIG. 2 illustrates a method 200 for cryptographically verifying a firmware image with boot speed in an information handling system according to an embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, by information handling system 100 depicted in FIG. 1, or any other type of system, controller, device, module, processor, or any combination thereof, operable to employ all, or portions of, the method of FIG. 2.

In an example, the flow of FIG. 2 may start based on any suitable detection trigger, such as a CPU reset detection. At block 204, a U-boot loads a kernel and a file system initialization program (initramfs). At block 206, a determination is made as to whether the kernel and initramfs were cryptographically verified. In an example, this decision is made to determine if the kernel and initramfs have been tampered with. If the kernel and initramfs are not verified, the U-boot switches the boot partition and reboots the management system at block 208, and the flow continues as stated above at block 204.

If the kernel and initramfs were cryptographically verified, the initramfs starts a stand boot process at block 210 and starts a DM-Verity daemon at block 212. In an example, the operations of blocks 210 and 212 may be performed in parallel, such that the two branches of flow 200 beyond block 206 may be performed in parallel. In certain examples, the standard boot process may start applications to be executed by a processor of the information handling system. In an example, the DM-Verity may be executed by any suitable processor in the information handling system. In an example, a priority level the DM-Verity may set in any suitable manner. For example, a nice value for DM-Verity may be set to control a priority of the DM-Verity with respect to other boot operations in the information handling system. In certain examples, as the nice value for DM-Verity increases the priority level decreases for DM-Verity so that the operations of DM-Verity do not compete with other boot operations within the information handling system. One of ordinary skill in the art would recognize that while the nice value and priority level for the DM-Verity has been described as inversely proportional, the relation between the nice value and the priority level may be directly proportional without varying from the scope of this disclosure.

At block 214, system manages operating system (OS) services within the information handling system. In an example, the operations of block 214 may continue while the operations in the other branch of flow 200 are executed. At block 216, DM-Verity begins a full read of a root file system (rootfs) and performs a cryptographic integrity check of the blocks in the rootfs. At block 218, a determination is made whether an initial full read of the rootfs has been completed. In an example, the determination of whether the initial read has been completed may be performed by any suitable component of the information handling system including, but not limited to, the DM-Verity daemon executed by a processor. If the initial full read of the rootfs has not been completed, DM-Verity reads a next set of rootfs blocks at block 220 and the flow continues at block 218. In an example, DM-Verity may perform the full read of the rootfs in any suitable manner including, but not limited to, a sequential reading of blocks in the rootfs.

If the initial full read of the rootfs has been completed, the kernel drops an underlying cache of the information handling system at block 222. In an example, the kernel drops the underlying cache based on any suitable notification including, but not limited to, a notification from DM-Verity that the initial read has been completed and an expiration of a timer after the full read has been completed. In certain examples, the DM-Verity may control the dropping of the underlying cache at any particular point. For example, DM-Verity may cause the cache to be dropped after a normal boot operation would utilize the data. At block 224, DM-Verity starts a slow patrol read of the device and the flow continues with a periodic slow patrol read of the device. In an example, the patrol reads of a flash device that checks for errors in the firmware may be performed at periodic intervals. The periodic intervals may be any suitable length of time including, but not limited to, once every week, once every two weeks, once every month, and once every two months.

Figure 3:
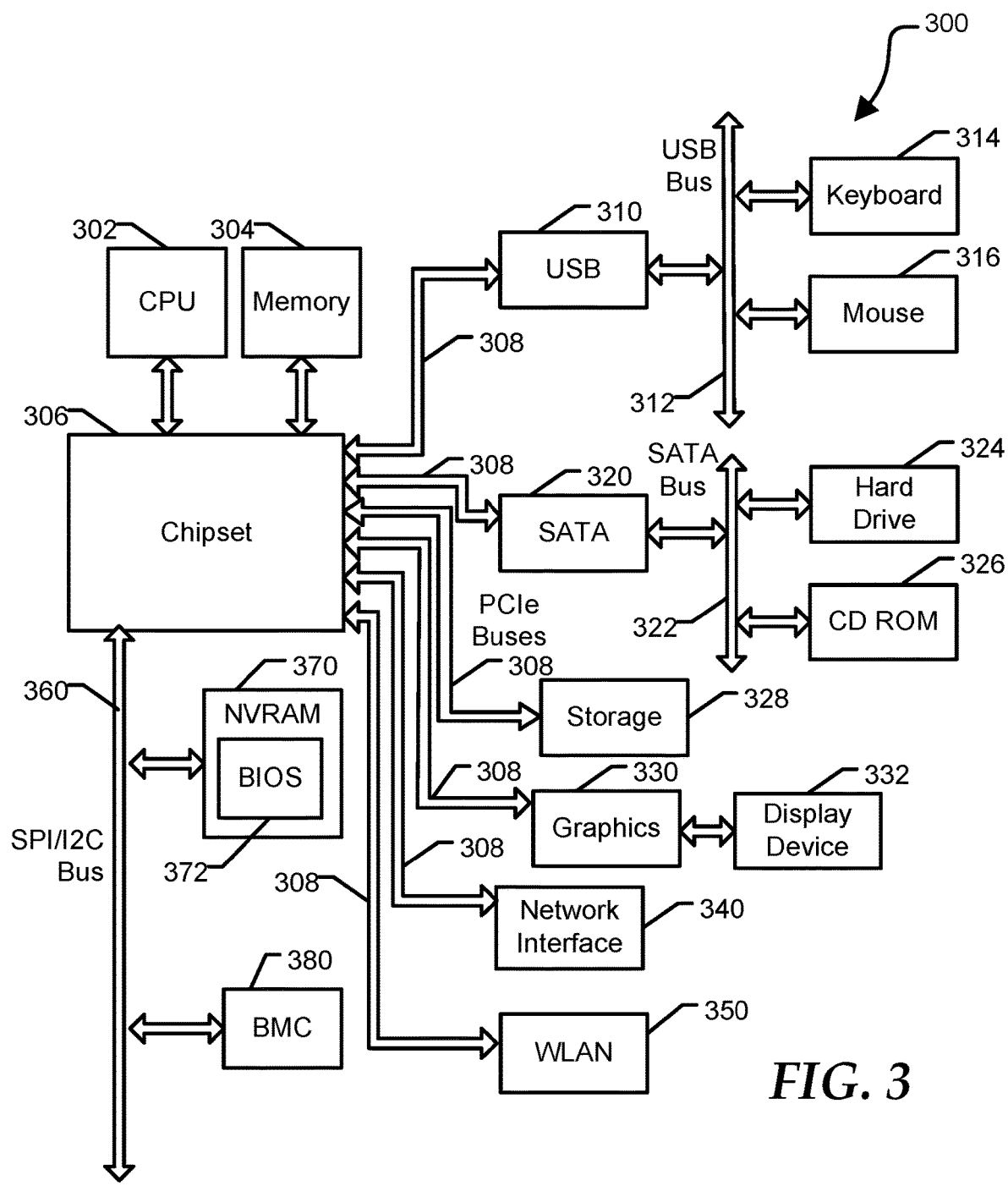
FIG. 3 is a block diagram of a general information handling system according to at least one embodiment of the present disclosure.

FIG. 3 illustrates a general information handling system 300. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 300 including a processor 302, a memory 304, a chipset 306, one or more PCIe buses 308, a universal serial bus (USB) controller 310, a USB bus 312, a keyboard device controller 314, a mouse device controller 316, a configuration a SATA bus controller 320, a SATA bus 322, a hard drive device controller 324, a compact disk read only memory (CD ROM) device controller 326, a storage 328, a graphics device controller 330, a network interface controller (NIC) 340, a wireless local area network (WLAN) or wireless wide area network (WWAN) controller 350, a serial peripheral interface (SPI) bus 360, a NVRAM 370 for storing BIOS 372, and a baseboard management controller (BMC) 380. In an example, chipset 306 may be directly connected to an individual end point via a PCIe root port within the chipset and a point-to-point topology as shown in FIG. 3. BMC 380 can be referred to as a service processor or embedded controller (EC). Capabilities and functions provided by BMC 380 can vary considerably based on the type of information handling system. For example, the term baseboard management system is often used to describe an embedded processor included at a server, while an embedded controller is more likely to be found in a consumer-level device. As disclosed herein, BMC 380 represents a processing device different from CPU 302, which provides various management functions for information handling system 300. For example, an embedded controller may be responsible for power management, cooling management, and the like. An embedded controller included at a data storage system can be referred to as a storage enclosure processor.

System 300 can include additional processors that are configured to provide localized or specific control functions, such as a battery management controller. Bus 360 can include one or more busses, including a SPI bus, an I2C bus, a system management bus (SMBUS), a power management bus (PMBUS), and the like. BMC 380 can be configured to provide out-of-band access to devices at information handling system 300. As used herein, out-of-band access herein refers to operations performed prior to execution of BIOS 372 by processor 302 to initialize operation of system 300.

BIOS 372 can be referred to as a firmware image, and the term BIOS is herein used interchangeably with the term firmware image, or simply firmware. BIOS 372 includes instructions executable by CPU 302 to initialize and test the hardware components of system 300, and to load a boot loader or an operating system (OS) from a mass storage device. BIOS 372 additionally provides an abstraction layer for the hardware, such as a consistent way for application programs and operating systems to interact with the keyboard, display, and other input/output devices. When power is first applied to information handling system 300, the system begins a sequence of initialization procedures. During the initialization sequence, also referred to as a boot sequence, components of system 300 are configured and enabled for operation, and device drivers can be installed. Device drivers provide an interface through which other components of the system 300 can communicate with a corresponding device.

Information handling system 300 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 300 can include multiple CPUs and redundant bus controllers. One or more components can be integrated together. For example, portions of chipset 306 can be integrated within CPU 302. Additional components of information handling system 300 can include one or more storage devices that can store machine-executable code, one or more communications ports for communicating with external devices, and various input and output (I/O) devices, such as a keyboard, a mouse, and a video display. An example of information handling system 300 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 300 may be any suitable device including, but not limited to, information handling system 100 of FIG. 1. Information handling system 300 can include a set of instructions that can be executed to cause the information handling system to perform any one or more of the methods or computer based functions disclosed herein. The information handling system 300 may operate as a standalone device or may be connected to other computer systems or peripheral devices, such as by a network.

In a networked deployment, the information handling system 300 may operate in the capacity of a server or as a client user computer in a server-client user network environment, or as a peer computer system in a peer-to-peer (or distributed) network environment. The information handling system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an example, the computer system 300 can be implemented using electronic devices that provide voice, video or data communication. Further, while a single information handling system 300 is illustrated, the term "system" shall also be taken to include any collection of systems or sub-systems that individually or jointly execute a set, or multiple sets, of instructions to perform one or more computer functions.

The information handling system 300 can include a disk drive unit and may include a computer-readable medium, not shown in FIG. 3, in which one or more sets of instructions, such as software, can be embedded. Further, the instructions may embody one or more of the methods or logic as described herein. In an example, the instructions may reside completely, or at least partially, within system memory 304 or another memory included at system 300, and/or within the processor 302 during execution by the information handling system 300. The system memory 304 and the processor 302 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
 a first memory to store a firmware image; and
 a baseboard management controller to:
  begin execution of a kernel, the kernel to perform a boot operation of the information handling system;
  begin a file system initialization program;
  during the boot operation, the baseboard management controller to:
   perform, via a DM-Verity daemon, a full read and cryptographic verification of the firmware image;

in response to the full read of the firmware image being completed, provide, via the DM-Verity daemon, a flush command to the kernel; and flush, via the kernel, a cache buffer associated with the baseboard management controller.

2. The information handling system of claim 1, prior to the beginning of the kernel and file system initialization program, the baseboard management controller further to:

perform a cryptographic verification of the kernel and the file system initialization program.

3. The information handling system of claim 1, wherein the baseboard management controller further to:

utilize, via the kernel, the data in cache buffer after the data is stored by the DM-Verity daemon.

4. The information handling system of claim 1, the baseboard management controller further to:

in response to the boot operation being completed, perform, via the DM-Verity, a slow patrol read of the firmware image; and during the slow patrol read, store data associated with the slow patrol read in the cache buffer; and in response to the slow patrol read being completed, flush the cache buffer.

5. The information handling system of claim 4, wherein the slow patrol read of firmware image is performed at periodic intervals.

6. The information handling system of claim 1, wherein data is stored in the cache buffer during the full read of the firmware image.

7. The information handling system of claim 1, wherein the full read of the firmware image is performed as a background operation during the boot operation.

8. The information handling system of claim 1, wherein a priority level of the full read is set to a low priority level to enable processing resources of the information handling system to be allocated to the boot operation.

9. A method comprising:

storing a firmware image in a first memory, wherein the firmware image is associated with a baseboard management controller of an information handling system;

beginning execution of a kernel, the kernel to perform a boot operation of the information handling system;

beginning a file system initialization program;

during the boot operation:

performing, by a DM-Verity daemon, a full read and cryptographic verification of the firmware image; and in response to the full read of the firmware image being completed, providing, via the DM-Verity daemon, a flush command to the kernel; and flushing, via the kernel, a cache buffer associated with the baseboard management controller.

10. The method of claim 9, wherein prior to the beginning of the kernel and file system initialization program, the method further comprises performing a cryptographic verification of the kernel and the file system initialization program.

11. The method of claim 9, further comprising utilizing, by the kernel, the data in cache buffer after the data is stored by the DM-Verity daemon.

12. The method of claim 9, further comprising:

in response to the boot operation being completed, performing, by the DM-Verity, a slow patrol read of the firmware image; and during the slow patrol read, storing data associated with the slow patrol read in the cache buffer; and in response to the slow patrol read being completed, flushing the cache buffer.

13. The method of claim 12, wherein the slow patrol read of firmware image is performed at periodic intervals.

14. The method of claim 9, wherein data is stored in the cache buffer during the full read of the firmware image.

15. The method of claim 9, wherein the full read of the firmware image is performed as a background operation during the boot operation.

16. The method of claim 9, further comprising setting a priority level of the full read to a low priority level to enable processing resources of the information handling system to be allocated to the boot operation.

17. A method comprising:

storing a firmware image in a first memory, wherein the firmware image is associated with a baseboard management controller of an information handling system;

performing a cryptographic verification of a kernel and a file system initialization program;

if the kernel is cryptographically verified, then beginning execution of the kernel, the kernel to perform a boot operation of the information handling system;

if the kernel is cryptographically verified, then beginning the file system initialization program;

during the boot operation:

performing, by a DM-Verity daemon, a full read and cryptographic verification of the firmware image;

storing, by the DM-Verity daemon, data associated with the cryptographic verification of the firmware image in a cache buffer;

utilizing, by the kernel, the data in cache buffer after being stored by the DM-Verity daemon; and if the full read of the firmware image is complete, then providing, via the DM-Verity daemon, a flush command to the kernel; and flushing, via the kernel, the cache buffer.

18. The method of claim 17, further comprising:

in response to the boot operation being completed, performing, by the DM-Verity, a slow patrol read of the firmware image; and during the slow patrol read, storing data associated with the slow patrol read in the cache buffer; and in response to the slow patrol read being completed, flushing the cache buffer.

19. The method of claim 17, wherein the full read of the firmware image is performed as a background operation during the boot operation.

20. The method of claim 17, further comprising setting a priority level of the full read to a low priority level to enable processing resources of the information handling system to be allocated to the boot operation.

* * * * *